United States Patent Office 3,021,004
Patented Feb. 13, 1962

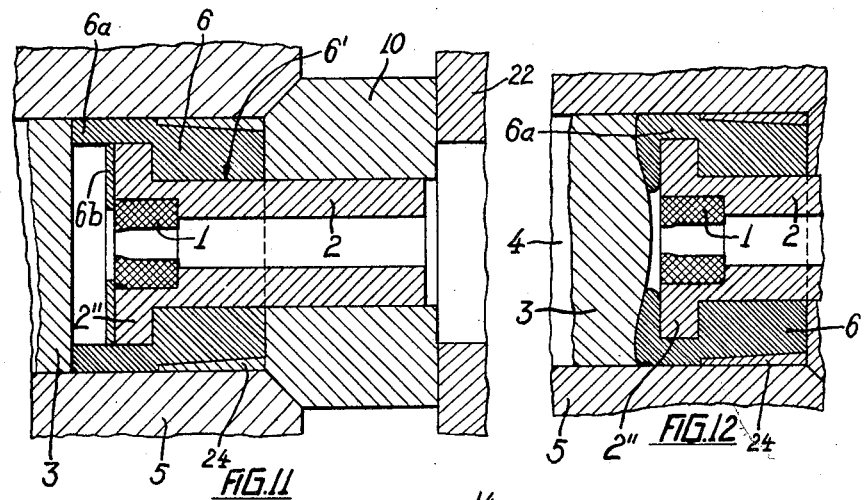
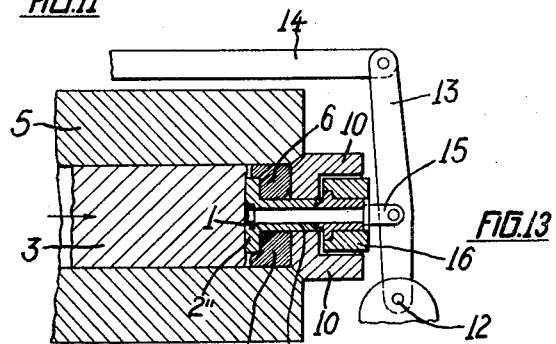
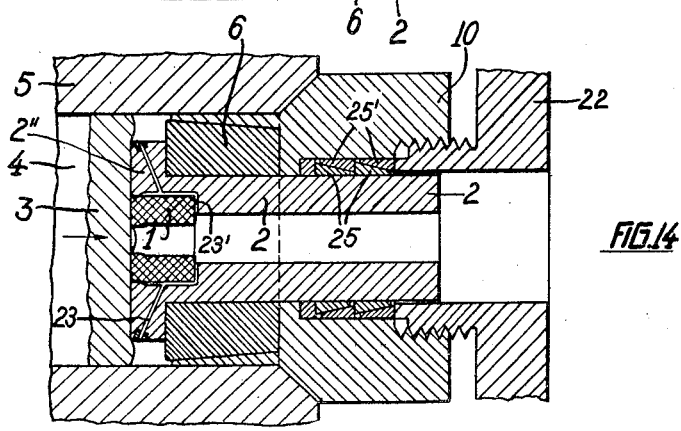

3,021,004
APPARATUS FOR PLATING PROFILES
Paul-Günther Erbslöh, Wuppertal - Barmen - Blombach, and Harry Wilke, Wuppertal-Ronsdorf, Germany, assignors to Julius & August Erbsloh Kommanditgesellschaft, Wuppertal-Barmen, Germany
Filed Jan. 7, 1959, Ser. No. 785,388
3 Claims. (Cl. 207—2)

The invention concerns an apparatus for cladding extruded metal shapes, in order to render corrosion-proof, the surface of core material which is insufficiently corrosion proof, for example, to provide copper containing aluminum alloys with a corrosion proof plated layer of pure aluminum.

It is an object of the invention to use an extrusion press in which a die with its backer or a cylindrical body in front of the die, projects into a container of the extrusion press. The annular space formed by the die with its container or the hollow body and the inner periphery of the container which is separated from the core material, serves to receive the cladding material.

Such a device renders possible, in the case of extruded shapes of aluminum and alloys thereof, for a glazeable surface of aluminum, having a high degree of purity (e.g. 99.8% to 99.9%), to be produced during extrusion. This step has the advantage that the core slug may be composed of a material having good mechanical properties, for example, high strength, without having to consider the surface properties (insufficient resistance to corrosion and/or glazeability). Since, however, it is possible for a core material of a lower degree of purity (e.g. 98% aluminum or alloys based on 98% aluminum) to be used, the invention will also bring about a saving in material and subsequent treatment costs.

The apparatus hitherto used for applying a layer of cladding on extrusion products are cumbersome and uncertain regarding the uniform thickness of cladding obtainable.

In contradistinction to the above, the present invention renders possible, by means of a conventional extrusion press, to carry out a perfectly uniform cladding operation in the course of the normal extruding operation, whereby the thickness of the cladding to be produced may be selected within a considerable range of values and with the important advantage that the thickness of cladding once chosen, is uniform, over the whole length of the extruded shape, and faultless.

The invention will be described further, by way of example, with reference to the accompanying drawings, in which:

FIG. 11 is a section corresponding to FIG. 8 using a preshaped ring of cladding metal and a premounted disc of cladding metal;

FIG. 12 is a section corresponding to FIG. 11 at the stage after commencement of the extruding operation, but without a premounted disc;

FIG. 13 is a modification of FIG. 8 having a control device for the movement of the die carrier; and FIG. 14 is a modification of FIG. 8 having a movement control device for the die carrier, using ring spring clamping elements.

Figure 1:
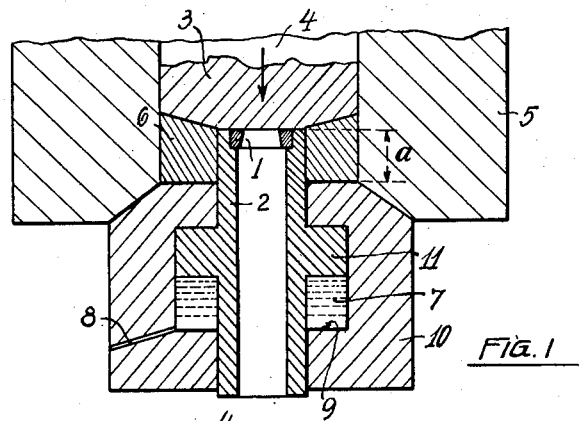
FIG. 1 is a section through the container of an extrusion press in the region of the die which is projecting, with its displaceably mounted guide, into the container.

As shown in FIG. 1, the die 1 with its container 2 projects into a hollow space 4 of a container 5 adapted to receive a core slug 3.

The dimension $a$ determines the height of an annular cladding metal 6 composed of cladding metal, which space may be tapered conically outwardly in the direction towards the core slug 3. In this case the core slug 3 has a correspondingly shaped end face, so that immediately on commencement of the extruding operation the material flow lines assume the shape corresponding to the normal flow process.

The die 1 and its container or backer 2 are mounted so as to be longitudinally displaceable. The movement control, in the example shown in FIG. 1, is effected by means of a medium 7, flowing under high pressure, for example a soft metal, which is discharged through the narrow channel 8. A regulating valve (not shown) may be provided at the end of this channel. This flow medium 7 is situated in a piston space 9 within the die head 10. A piston-like annular flange 11 of the die backer or container 2 displaces the medium 7 during extrusion. The discharge speed of the medium is so chosen that the yielding of the die 1 rendered possible thereby is effected to the extent that cladding metal 6 is carried along by the extruded shape emerging from the die 1. This produces a completely uniform thickness of the cladding resulting therefrom.

Figure 2:
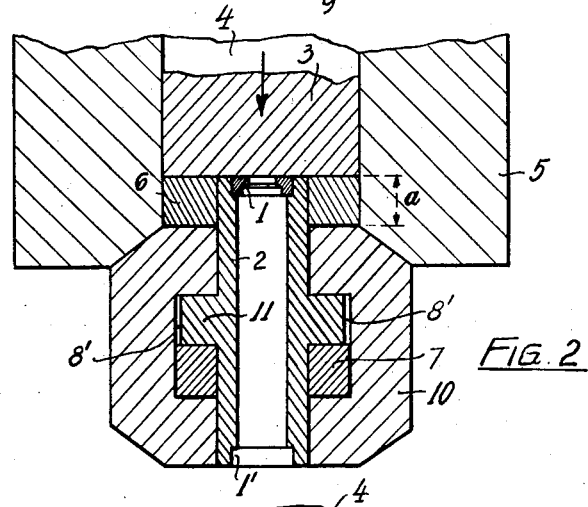
FIG. 2 is a modification of FIG. 1 using the circulatory overflow principles with regard to the medium controlling the movement of the die and its container namely at the beginning of the extrusion operation.
Figure 3:
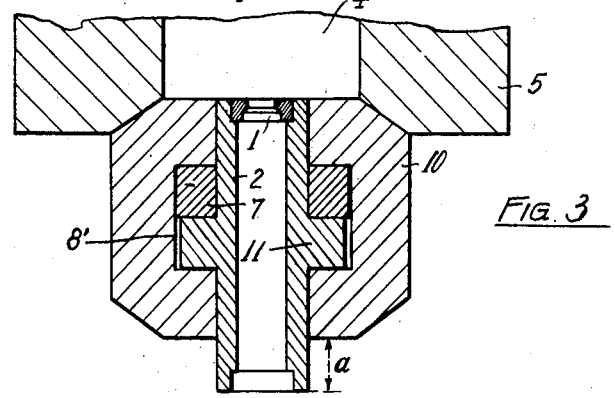
FIG. 3 is a section corresponding to FIG. 2 on completion of the extruding operation.

In the examples shown in FIGS. 2 and 3 there is used a principle corresponding to FIG. 1 with the modification that the flow medium 7 arrives in passages 8' in the periphery of the annular piston flange 11 during the yielding of the die 1 with its backer 2 having the annular piston flange 11, from the front surface of the annular piston flange to the rear surface thereof. On completion of the extrusion operation (see FIG. 3), a die head 10 designed as a mirror image of the head 10 of FIG. 2, after shifting the die 1 to a recess 1' provided on the other side of the die head, can be turned through 180° and remounted on the container 5.

Figure 4:
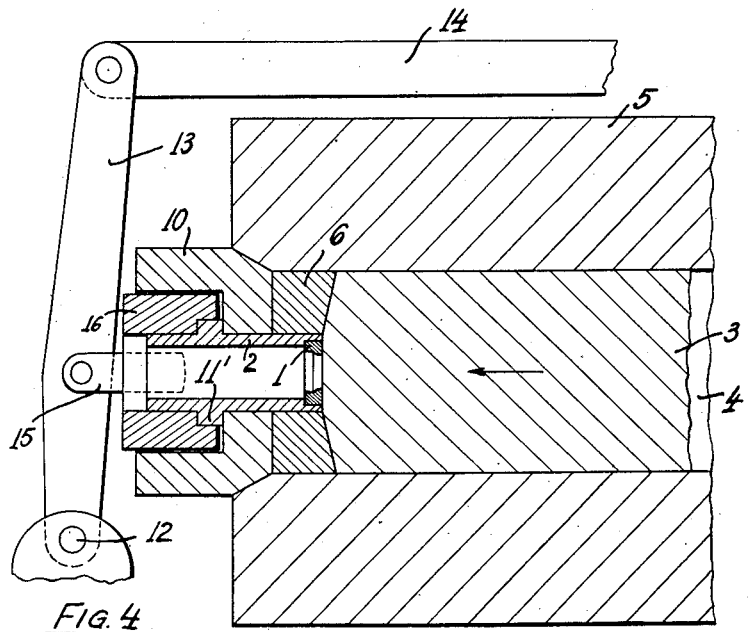
FIG. 4 is a section corresponding to FIG. 1 showing the use of a lever control for the movement of the die and its support.

In the example shown in FIG. 4 there is used a lever mechanism 13, 14 mounted at a point 12 and adapted to be actuated and controlled from the outside for controlling the longitudinal movement of the die 1 with its backer 2. The lever mechanism 13, 14 engages, by way of a pair of guide bars 15, a sleeve-like insert 16 mounted in the die head 10, which insert abuts against an annular flange 11' of the die backer 2. In place of the lever mechanism 13, 14 there may be provided a large worm, the thread of which acts on the sleeve insert 16 which, in this case, is rotatably mounted relative to the die backer 2, for example, by means of interposition of a ball bearing.

Figure 5:
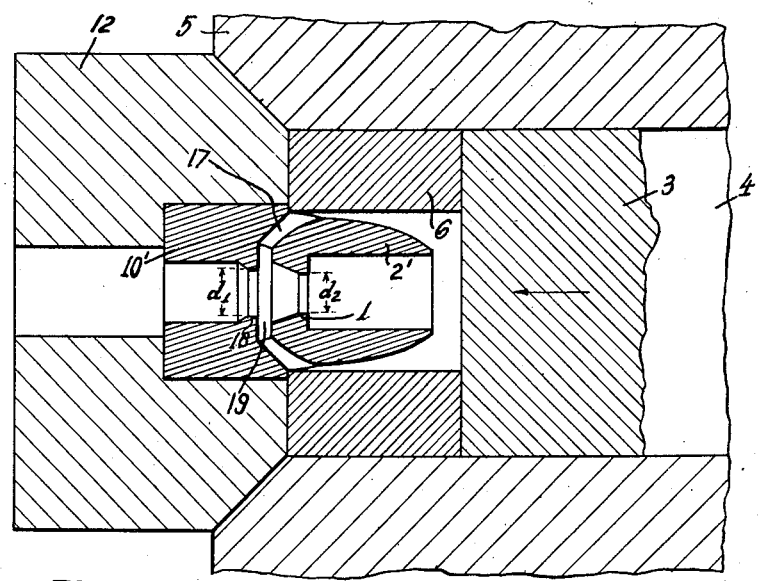
FIG. 5 is a section through the container, in the region of the fixed die and its container, using supply carriages to a cladding chamber, after the press has been charged.
Figure 6:
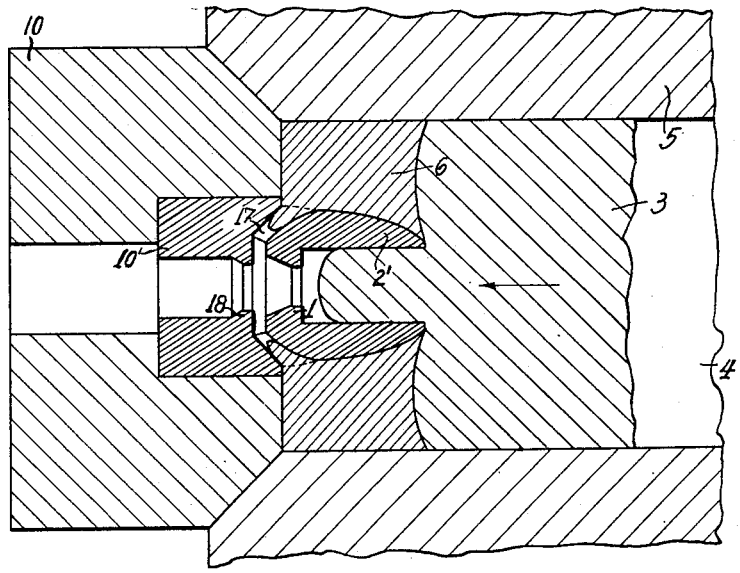
FIG. 6 is a section corresponding to FIG. 5 at the beginning of the extruding operation.
Figure 7:
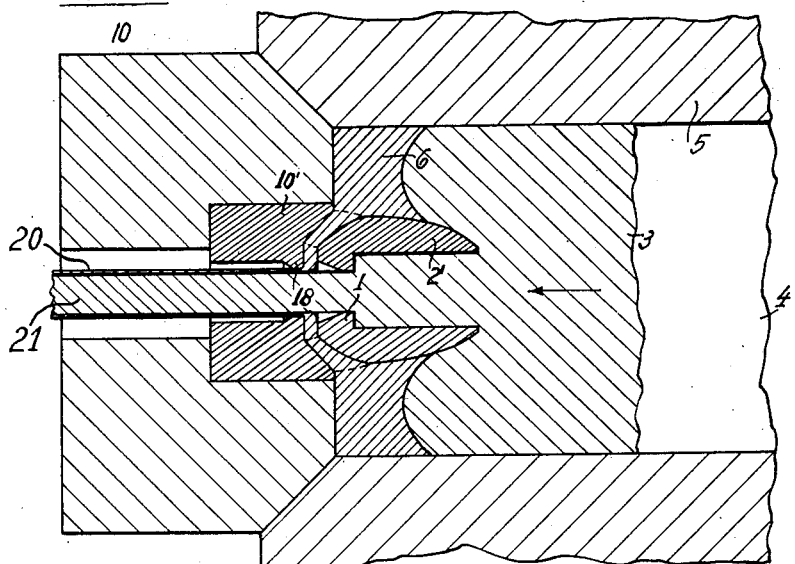
FIG. 7 is a section corresponding to FIG. 5 during the extruding operation.

In the arrangement shown in FIGS. 5 to 7, a premounted hollow body 2', projecting into the container bore 4, is fixedly mounted on a die head 10'. The body 2' however has supply passages 17, through which the cladding metal 6 can be discharged. In the die head 10' there is disposed a double die 1, 18. The internal measurements $d_1$ of the die step 18 are larger by the desired thickness of cladding than the internal dimensions $d_2$ of the preliminary die 1 for the core metal 3. An annular space 19, in which the cladding metal is first discharged and from whence it is carried along by the extrusion 21 as the cladding layer 20, is provided between the end of the supply slot 17 and the die step 18. Separating lines of the assembly of the dies 1, 18 of the head 10' and the front part 2' have been omitted from FIGS. 5 to 7 in the interest of better clarity.

In the example shown in FIGS. 8 to 14, the die carrier 2, on its end projecting into the hollow space 4 of the container, has an annular flange 2", which partly covers the cladding metal ring 6. The hollow space 6' is thus constricted and it is advantageous to impart to the ring 6 of cladding metal an initial shape corresponding to this hollow space 6', as shown in FIG. 11. As shown in FIG. 11 a collar 6a may even overlap the flange 2" and moreover, a disc 6b may be inserted between the flange 2" and the core slug 3.

Figure 8:
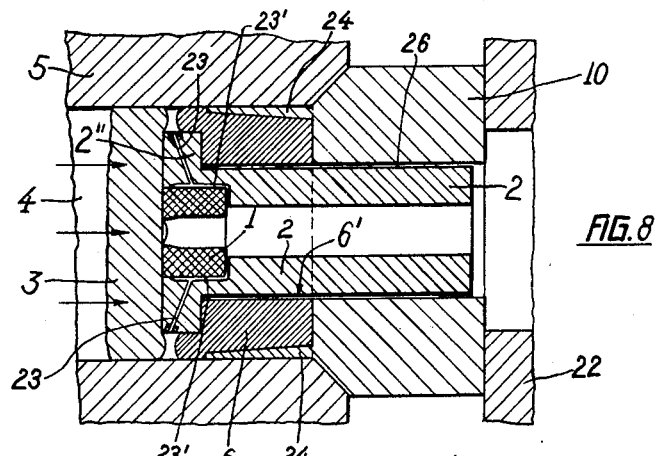
FIG. 8 is a section through a part of an alternative embodiment of an extrusion press in the region of the front portion, of the container, at the stage just before commencement of the extruding operation.
Figure 9:
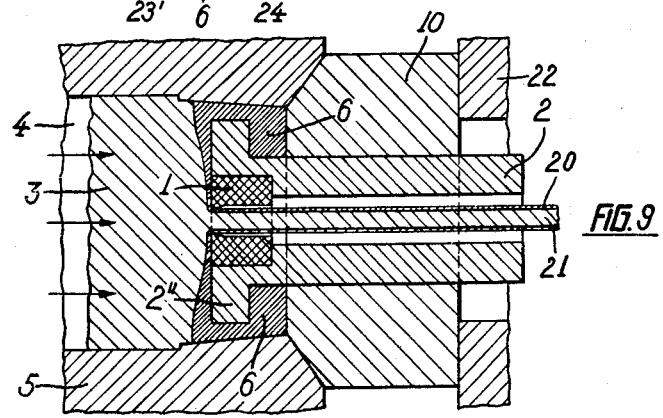
FIG. 9 is a section corresponding to FIG. 8 at the stage of progressing extruding operation.
Figure 10:
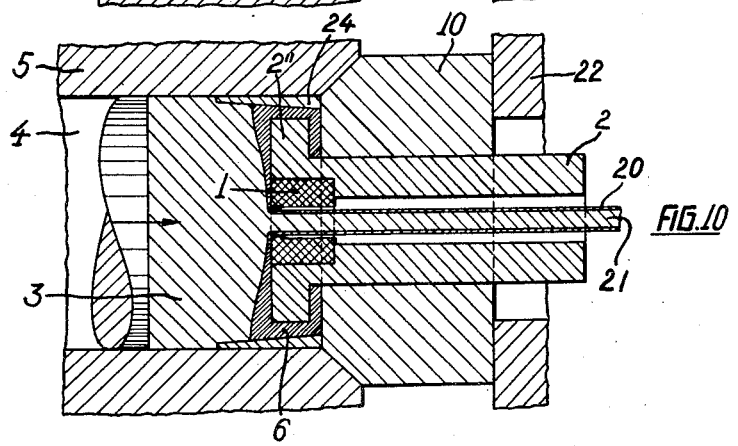
FIG. 10 is a section corresponding to FIGS. 8 and 9 at the stage showing extruding operation practically completed.

As shown in FIGS. 8 to 10, the core slug 3 exerts a pressure on the annular flange 2" of the resiliently or displaceably mounted die carrier 2 and hence on the cladding metal 6 which, under the action of this high surface pressure, escapes through the slot formed between the outer surface of the flange and the inner wall of the container, and is then carried along by the core metal in the direction of the die perforation.

To maintain the speed of yielding of the die backer constant in relation to the extrusion speed for obtaining a uniformly thick cladding layer and for the layer to be so dimensioned that the desired thickness of cladding is not substantially lower or exceeded, it is convenient to use an additional or regulating mechanism for example, corresponding to the one shown in FIG. 4. As the main portion of the pressure acting on the die carrier has already been absorbed by the flange 2" because it abuts against the cladding metal 6, it is possible for the remaining pressure to be absorbed by means of a regulable or controllable device in such a way that uniform cladding is produced over the entire extrusion length at a predetermined thickness, this control device now having to manage substantially lower forces.

Whilst in the design of the embodiment shown in FIGS. 1 to 3 the whole pressure bearing on the surface formed by the upper surface of the die and the cross-sectional surface of the die carrier surrounding the die, reduced by the frictional resistance between the jacket surface of the die backer and the cladding metal, is at rest and will have to be absorbed by the regulating device, in accordance with a further feature of the invention only the remaining pressure bears on this regulating device. This pressure, for example, amounts on an average to only 20% of the pressure exerted on the die and the environment thereof, and can therefore be easier controlled.

A further possibility of regulation shown in FIG. 14 resides in that, by means of annular ring sets 25, 25' there is exerted a regulable breaking action on the feed advance of the die carrier. These annular springs 25, 25' are provided with conical surfaces compressed to a greater or lesser extent by means of tightening the screw connection 22 to a greater or lesser extent. It is also possible to replace the annular springs which, for preventing corrosion, are all or partly composed of bronze, by packing material of asbestos with graphite or the like.

To avoid air being trapped between the core material and the cladding material it is expedient for the space 6' to be ventilated (see FIGS. 8 and 14). To this end, in the front region of the die carrier 2 there are formed bores 23 having a very small diameter (e.g. 0.6 mm.) distributed over the periphery. These bores terminate in narrow grooves 23' or they lead directly into the hollow space of the die carrier 2.

Air locks are also prevented in the arrangement shown in FIG. 11 in which, before commencing the extruding operation, a preshaped cladding metal body 6b is inserted. When the extruding operation commences the protruding collar 6a of the cladding metal 6 is flattened, thus causing cladding to be effected soon after the extruded products 3' emerge from the press.

As the friction between the die carrier 2 and the cladding metal 6 decreases due to the shortening of the friction surface in course of the extruding operation and therewith the braking effect acting on the die carrier decreases, it is advisable to compensate the reduced braking action by means of a steel cylinder 24 having a conical bore. This causes the distance between the die carrier flange 2" and the conical inner wall of the steel cylinder 24 to be reduced in course of the extruding operation, so that the flow resistance for the cladding metal gradually increases. The constriction body 24 may be provided as an independent insert, or it may form an integral part of the container 5 or the die head 10, as indicated alternatively in FIGS. 8 to 14.

The cladding material 6 however may also be used to participate in lubricating the die carrier 2 in the die head 10 by the fact that, between these two members, there is provided a narrow gap 26 as indicated in FIG. 8. Thus there is simultaneously obtained a progressively increasing braking effect, as the length and hence the filling measure of the gap space 26, is progressively increased.

We claim:

1. In an extrusion press for producing profiled bodies, in combination, a billet container with a generally elongated billet chamber having a discharge extremity that is closed except for a bore therethrough coaxial with said chamber, a longitudinally displaceable die holder slidably disposed in said bore, said die holder having an annular flange projecting radially therefrom at the billet-engaging end thereof, said flange being spaced from the the walls of said chamber, thereby forming with said walls an annular compartment opening toward the other extremity of said chamber; a die in said holder at said billet-engaging end, said die having an extrusion orifice extending therethrough; and ram means reciprocable in said chamber remote from said die for forcing a billet of a first material flowable under pressure out of said chamber and through said die and concurrently exerting pressure on said flange causing the latter to force a continuous flow of a second material flowable under pressure from said compartment between said flange and said walls of said chamber into contact with said first material whereby said second material is carried by said first material through said die and forms a surfacing layer on the body thus produced.

2. The combination set forth in claim 1 wherein said flange has at least one passage extending from the periphery thereof to a location beyond said extrusion orifice.

3. The combination set forth in claim 1 wherein said compartment has walls converging toward said discharge extremity.

References Cited in the file of this patent

UNITED STATES PATENTS

| 124,568 | Granniss | Mar. 12, 1872 |
| 867,658 | Hoopes et al. | Oct. 8, 1907 |
| 2,832,468 | Krause | Apr. 29, 1958 |
| 2,887,224 | Stulen | May 19, 1959 |

FOREIGN PATENTS

| 624,466 | Great Britain | June 9, 1949 |
| 844,287 | Germany | July 17, 1952 |
| 906,925 | Germany | Mar. 18, 1954 |